Figure 1:
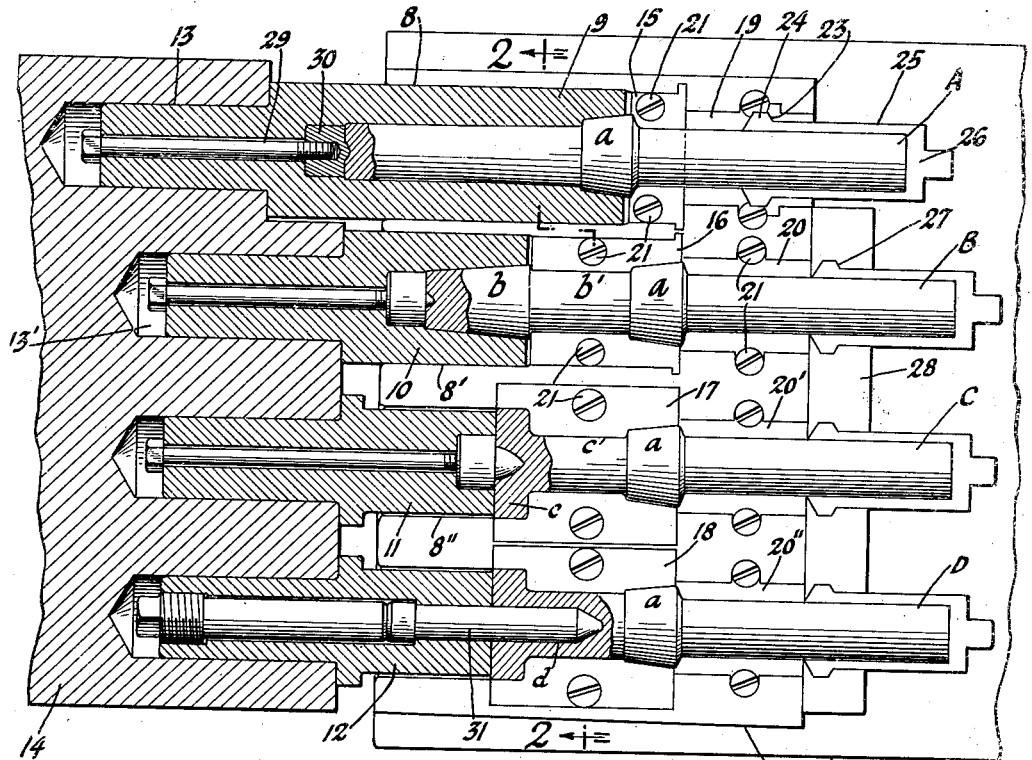

May 19, 1936.  W. E. SANDERS  2,040,957

METALWORKING PROCESS

Filed April 28, 1933  2 Sheets-Sheet 1

Inventor
Wilbur E. Sanders
By Blackmore, Spencer & Flint
Attorneys

May 19, 1936.　　　W. E. SANDERS　　　2,040,957
METALWORKING PROCESS
Filed April 28, 1933　　2 Sheets-Sheet 2

Inventor
Wilbur E. Sanders
By Blackmore, Spencer & Flint
Attorneys

Patented May 19, 1936

2,040,957

UNITED STATES PATENT OFFICE 2,040,957

METALWORKING PROCESS

Wilbur E. Sanders, Flint, Mich., assignor to General Motors Corporation, Detroit, Mich., a corporation of Delaware Application April 28, 1933, Serial No. 668,296

4 Claims. (Cl. 29—159.2)

The invention relates to the working of steel and the production of forgings and articles machined therefrom. The principal object is to produce forgings of improved character, particularly with reference to their machining properties, and to effect an increase in the uniformity, accuracy and physical properties of the articles made from such forgings. To this end, the invention includes, as its more important features, first the selection of a steel and treatment thereof peculiarly suited for the purpose, and second, the maintenance of forging practice and conditions adapted to develop to the highest degree the desirable properties in the forged articles.

Although not limited in its generic features to the production of any specific article, the invention will be described herein as applied to the manufacture of gears, a field in which remarkable success has been achieved.

General practice in the manufacture of gears of small sizes, such, for example, as those employed in conventional automobile transmission mechanisms, includes the forging of gear blanks from pieces cut from rolled bar stock of steel of specified analysis. The blank is then annealed or "normalized" and after cooling, is subjected to the necessary drilling, broaching and turning operations and is then cut, usually by hobbing. A subsequent heat treatment is generally employed to harden the wearing surfaces.

The accuracy of the finished gear and resultant wearing qualities are affected not only by the physical properties of the steel but also by the correctness of the machining operation and, by the extent of change during the subsequent heat treatment.

It is well known that the heat treatment of machined forgings, for example, for case hardening, results both in volumetric changes and usually, in a certain amount of distortion which, in the case of a gear, may produce eccentricity and defective tooth spacing and alignment. Such defects, unless corrected by difficult and expensive grinding, result in a high percentage of rejections and consequent loss and also in noisy and short-lived gear sets.

As to the machining operation, the accuracy of the work depends upon the accuracy of the hob or other cutting tool and also upon the machining characteristics of the steel and the uniformity of such characteristics throughout the blank, thereby enabling the tool to make a sharp, clean cut and to maintain a uniform pressure upon the work. Lack of uniformity in machining characteristics in successive work-pieces necessitates an adjustment of tool speeds, work cycles, etc., to accord with the most difficult pieces, otherwise the pieces harder to machine bring about excessive tool wear, break downs, inaccuracy of cutters, and frequent tool changes. For economy of production therefore, as well as high quality of output, not only is it necessary to have a material of high "machineability", i. e., that can be cut easily and cleanly, but to have these qualities uniform throughout the work-piece or forging and in all the pieces of a given lot.

Gear manufacturers, whose product must meet peculiarly severe demands, have encountered great difficulty in obtaining steels possessing satisfactory and uniform machining qualities and in maintaining uniformity during the manufacturing operation. As an illustration from actual practice, with forgings made from steel of a given analysis and hardness, and subjected to the same annealing cycle, a lathe hand could readily divide the forgings into two groups, one of which could be cut with approximately forty gears per hob grind whereas the other group required a hob grind for every two to five gears.

In trying to discover the reason for such remarkable differences and to eliminate the resultant difficulties, I found that the solution of the problem involved not only the procuring of a steel which, because of certain previously unsuspected properties, was capable of developing a high degree of machineability, but also the production and maintenance of a high degree of uniformity in such property throughout the material and throughout the forgings made therefrom. The property of being easy to machine; i. e., cutting without excessive tool pressure and without tearing or roughening of the cut surface generally termed "machineability"), varies, of course, with the analysis of the steel but I have found that it varies also with the character of the working and with the grain size.

Grain size is now commonly designated in terms of what is known to steel manufacturers as the "McQuaid-Ehn scale." In determining grain size under this system of measuring, a specimen of the steel is carburized at 1700° F. for 8 hours and cooled slowly and an etched section examined under a magnification of 100 diameters. Grain size No. 3 in accordance with the scale will show 3–6 grains or crystals per square inch, size No. 4 will show 6–12 grains, No. 5, 12–24 grains, No. 6, 24–48 grains, No. 7, 48–96 grains and No. 8, 96 or more grains.

I am aware that steels of a smaller grain size are generally regarded as having greater toughness, higher impact value and less distortion in heat treatment. I have found, however, greater uniformity of distortion (for which allowance can be made in machining) in the coarse grained steel, when properly forged under compression. When properly forged the impact values shown by actual tooth impacts in gears are higher than with fine grained steel when improperly forged. This is because the coarse grained steel flows more easily in the dies with less distortion or rupture of the fiber and enables a highly dense structure to be produced. A grain size of Nos. 3-5 has been found most favorable to the development of machineability. No. 4 is preferred for this effect.

It is desirable also that the stock shall be as homogeneous as possible not only in the analysis but in physical properties and also have a highly dense structure. To this end special heat treatments may be employed including soaking or "diffusion" treatments. In applying such treatment the ingot, after casting, may be rolled down to a section of say 6 x 6 inches, enclosed in a sealed tube, and heated to a temperature somewhat below the melting point for a few hours. After cooling, the billet may then be reheated to rolling temperature and rolled down to the bar size required.

I have also found that most satisfactory properties are secured if the ingot size bears a definite relation to the size of bar stock so that the reduction in size shall not result in rupturing the fiber of the metal to any material extent. For this reason it is preferred that stock of 1 to 1⅝ inch diameter, for example, shall be rolled from ingots of not more than 12-14 inches, (Gathmann type), the weight of which may be approximately 4000 lbs. For larger sizes of stock the ingot size may be proportionately increased; e. g. stock of 1¾ to 2¼ inches should be rolled from ingots of 19-20 inches weighing approximately 6000 lbs. and stock of 2¾-4 inches from ingots of 26-28 inches weighing approximately 8000 lbs. The above specifications are suitable for all of the alloy steels.

A very important factor in maintaining uniformly high machineability I have found to reside in the character of the forging operation. Two forgings of the same steel from the same die may vary enormously and forgings from dies of different structure may show similar variations. A blank which does not completely fill the die develops, in the process of changing its form, a micrographic structure exhibiting, upon deep etching, a distorted or torn fiber structure or porosity which is either the cause of, or at least accompanies, a very great loss of machineability. Similarly, a blank which forms a material flash between the edges of the die, so that the pressure of the die is exerted upon the flash rather than upon the formed object, shows a like loss in machineability. I have found it highly essential therefore to so design the die as to completely confine the blank within the die and use sufficient material to fill the die cavity. By this procedure the article is formed and confined under relatively great pressure which, at the high temperature to which I prefer to heat the stock, seems to densify the metal. At any rate the effect is to render the forging capable of developing, when subsequently annealed, an extremely uniform and homogeneous micro-structure and a high degree of machineability.

Figure 2:
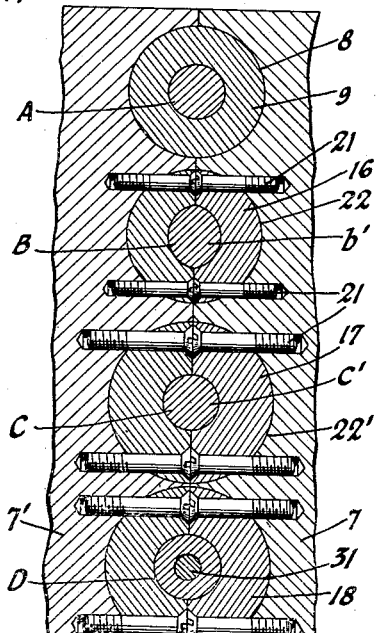
Figure 4:
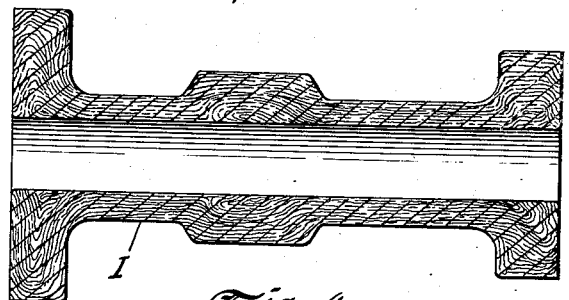
Figure 3:
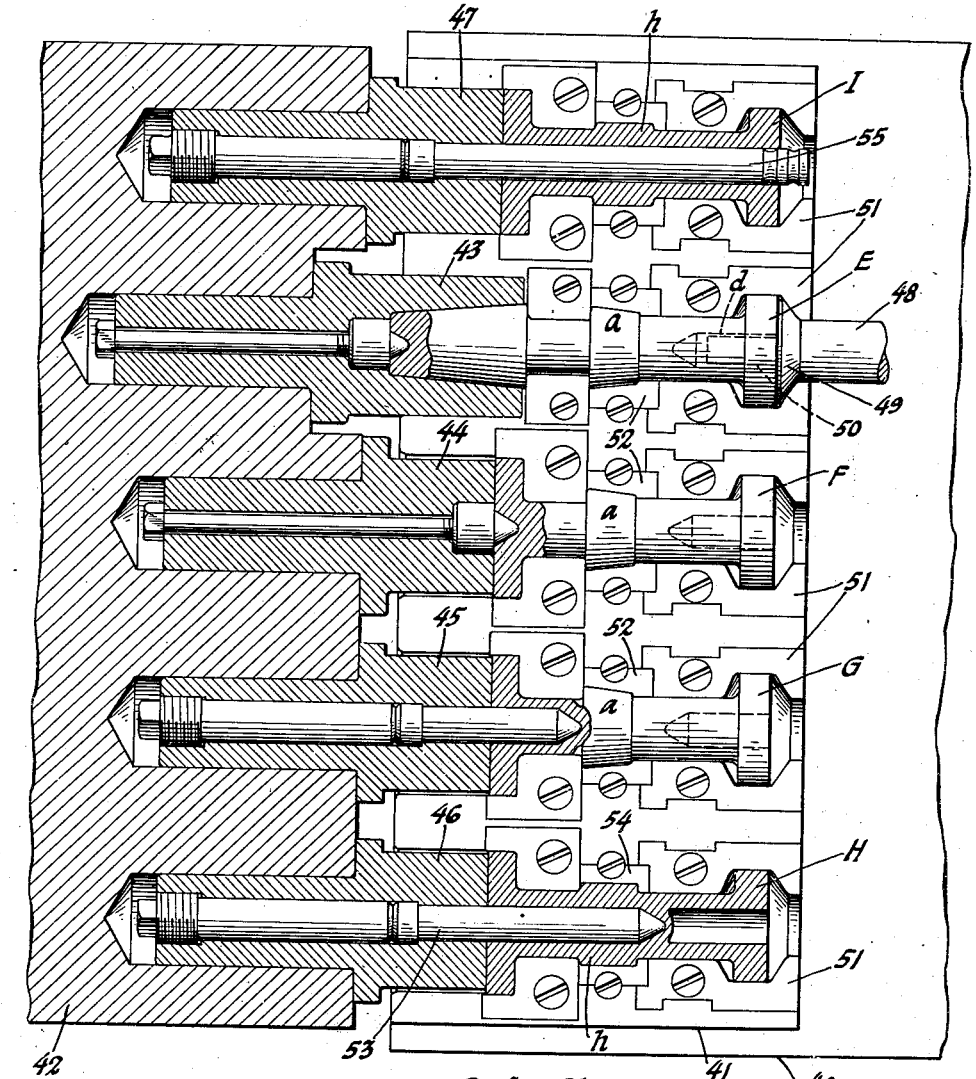
Figure 5:
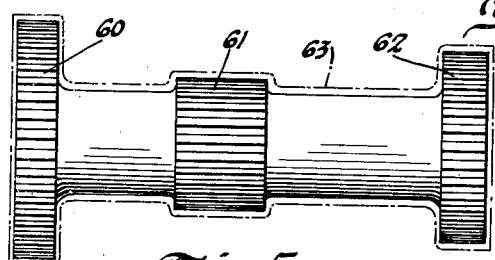

In the accompanying drawings, Fig. 1 is an elevation, partly in section, showing parts of a forging mechanism. Fig. 2 is a section on line 2—2 of Fig. 1. Fig. 3 is an elevation, partly in section, showing parts of another forging mechanism and Figs. 4 and 5 show, respectively, a forged blank and a completed gear of the type which may be forged in the dies illustrated in Figs. 1, 2 and 3.

Referring to Figs. 1 and 2, 6 indicates a machine bed or support on which is rigidly mounted a die block 7. This block is provided with semi-cylindrical cavities, as at 8, 8', 8'', etc. to receive the upsetting or compressing and forming tools 9, 10, 11, 12, supported in suitable bored recesses 13, 13', etc., in a reciprocable header 14.

Fig. 1 represents the die block 7 as seen in face view, work pieces being shown in four successive stages of formation at A, B, C and D. A second die block 7', having the relation of "mirror symmetry" to the die block 7, is mounted upon a second bed or foundation facing the die block 7, the two bed portions being movable toward and from each other in the manner usual in die shaping machines to open and close the die cavities for insertion and removal of the work. While I have shown four work pieces in position, it will be understood that, unless the machine is of very heavy construction or the work pieces relatively small, it may be necessary to perform only one operation at each reciprocation of the die block 7, 7' and header 14, the work piece being moved successively from one position to the next lower position.

For convenience in building and repairing the die blocks, the die recesses therein are formed in separate, removable die inserts, indicated at 15, 16, 17, 18, 19, 20, 20' and 20''. These inserts are secured, as by screws 21, in semi-cylindrical recesses, as 22, 22', in the die blocks. By reason of the use of separate inserts for the various parts and forms of the die cavities it is possible to employ high grade material of superior hardness and wearing qualities for the die surfaces and to renew or replace the various parts as required without discarding an entire block.

In the inserts 19 are formed semi-annular grooves 23 adapted to receive a collar 24 on the outer end of a tong member 25, in which the cylindrical portions of work piece A may be received and by which the work piece may be manipulated for transfer from one position to another. The tong members may be of such depth as to permit the end of workpiece A to seat on the base 26 of the tong member. Grooves 27 in additional blocks 28, secured to the ends of the die blocks 7, 7', provide seats for the collar 24 in the positions of the workpiece represented at B, C and D.

The heading or upsetting tools 9, 10, 11, 12 are bored to receive spindles or bolts 29 by which abutment blocks 30 are held in the end of the forming or upsetting tool. These blocks, being replaceable, may be of special material and may be changed or renewed as required. The successive blocks in the tools here illustrated are formed to pierce successively deeper recesses in the end of the workpiece and the fourth heading tool, 12, is provided with an extension 31 whose chief function is to pierce quite deeply into the work piece D.

The operation of the mechanism this far described is as follows: A blank consisting of a straight bar of cylindrical cross-section, preliminarily heated to a temperature of approximately 2300-2400° F. on coarse grain and a somewhat lower temperature on fine grain, is seized in a pair of tongs 25 and placed in the position A.

The die blocks 7, 7' being brought together, the heading tool 8 is moved toward the work, thereby expanding the intermediate portion of the blank as at $a$ to fill the conical shaped recess in heading tool. The blank is supported against the endwise thrust of the heading tool for this operation by the tong member 25 engaging in the seat 23 of insert 19.

The header and die supports or beds having been reversed in position to open the dies, the workpiece is now placed in the die recesses in inserts 16 and 20 and the header operated to bring tool 10 into engagement with the end portion of the workpiece, compressing and forming it to the conical shape shown at $b$. The form of the die recesses in inserts 16 may also be such as to cause compression of the shank portion $b'$ to a slightly elliptical cross-section, thus gradually reducing the diameter or at least changing the contour of the cross section and working and compressing the metal.

In the next operation, after placing the workpiece in the die inserts 17 and 20', the upsetting tool 11 engages with the conical head $b$ and flattens it as shown at $c$. The recesses 8" are slightly larger in diameter than the upsetting tools so that, if any flash is formed, it flows into the space around the upsetting tools, so that the pressure exerted by the header is effective directly upon the end of the workpiece and not at all upon the flash. In this operation the die inserts 17 may also be formed to further work and reduce the shank portion $b'$ giving it a smaller but cylindrical cross-section as at $c'$.

In the fourth step, where the workpiece is held in the insert 18 the heading tool 12 exerts again a compressing effect upon the head portion $c$ which is being pierced by the tool portion 31 to form the bore $d$. The diameter of die recess in inserts 18 is greater than that in inserts 17 so that, the proper amount of metal in the shank having been determined by the reduction in inserts 16 and 17, the tool 31 expands the metal to fill the dies 18.

It will be noted that, in every step, the parts of the workpiece whose form is undergoing change are subjected to direct compacting pressure exerted wholly on such parts between the dies or between the dies and heading or piercing tools.

The steps already described complete the forging of one end of the gearing group which after reheating, is subjected to further working to form the other end. This working is carried out with the mechanism shown in part in Fig. 3 in which 40 indicates a bed supporting a die block 41. A header 42 carries forming tools 43, 44, 45, 46, 47. The successive operations and the corresponding positions of the workpiece are represented at E, F, G, H and I.

The die blocks of this forging machine are built up, as in the form already described, by rigidly securing die inserts in a solid block. The die block 41 is shown as viewed from the face, i. e., from the side which, when the dies are closed, will engage the face of the other die block, the die recesses in the two blocks together constituting the die cavities in which the workpieces are received. The gripping tool or "tongs" for this series of operations, shown at 48, is provided with a shoulder 49 and an extension 50 adapted to engage in the bore $d$ formed by the piercing tool 31. The shoulder 49 fits the outer portion of the die recess in the series of inserts 51, thereby assisting in supporting the workpiece. The recesses in the inserts 52 fit the enlarged portion $a$ of the workpiece and also assist in supporting the thrust of the heading tools.

The heading tools 43, 44 and 45 are similar to the tools 10, 11 and 12 of the machine first described and the operations performed upon the workpiece at E, F and G are similar to those performed at B, C and D on the first machine, the difference being merely a matter of the dimensions of the parts. In the operation at H, however, the piercing tool 53 is caused to penetrate the workpiece to a point beyond the enlargement $a$, thereby expanding such part to fill the cylindrical cavity in the die inserts 54 and forming the cylindrical portion $h$ of the workpiece.

In the operation at I the punch 55 is caused to complete the piercing of the bore in the workpiece, driving before it a slug of any excess metal and completing the forming of the bore. This completes the forging operation. It will be understood that there may be minor variations in the successive die cavities in addition to those described in order to produce, step by step, the final form of the forging. It is important, of course, that the blank should contain sufficient metal to completely fill all the die cavities in the successive operations, as, otherwise, it would be imposible to exert on the workpiece the high and uniform pressure desired. It is also preferable that the amount of metal in the blank in excess of the necessary amount should be slight, as it is preferred to provide only a small area for escape or extrusion of flash.

It will be noted that, in each of the five operations illustrated in Fig. 3 as well as in the four operations illustrated in Fig. 1, the heading or upsetting tools and the piercing tools engage with and exert direct compression upon the workpiece. It is essential, in accordance with my invention that such compression be effected. Whatever the variations may be in the form of the forging, the dies should be so designed as to exert direct compacting pressure upon the forging and so that this pressure may be uniform in all the pieces forged, in order to insure uniform physical characteristics.

The micrographic structure produced in a forging made as above described is illustrated in Fig. 4 showing a cluster gear forging in central longitudinal section, etched to display the fibrous structure of the steel. It will be obvious that the fiber arrangement is such as to provide highly uniform physical characteristics around the periphery of the forging. The importance of this feature will be understood upon inspection of Fig. 5 showing a completed cluster gear on which have been machined the gears indicated at 60, 61 and 62. The surrounding portion 63 indicates the part removed in the machining operation. It will be noted that the fiber structure of the forging bears the same relation to the wearing surfaces at substantially every area to be machined, which, obviously, results in a high degree of uniformity in machineability. Furthermore, the compacting effect of the peculiar forging operations produces remarkably uniform and dense forgings, no porosities or "soft" spots or torn and distorted fiber appearing on etching. The pressure required of the cutting tools is correspondingly constant. The progressive and gradual changes in form are also important since too great distortion in a single operation tends to rupture the fiber and render the metal non-uniform in its machining and wearing properties.

In the manufacture of gears, for example, from bar stock of the character above described, I heat the stock before forging to a temperature of 2300–2400° F. for coarse grain steels and lower temperature, varying somewhat with the composition of the steel, for finer grain steels. For example, the grain sizes preferred for various steels and the corresponding forging temperatures are approximateily as follows:—for the usual high manganese carbon steels such as those of the 1300 series (S. A. E. standard), the nickel-chromium steels such as those of the 3100 and 3200 series, and the chromium steels such as those of the 5100 series, a grain size of 3–5 and forging temperature 2300–2400° F.; for nickel steels such as those of the 2000, 2300 and 2500 series, a grain size of 4–6 and forging temperature 2150–2250° F.; for chromium-molybdenum and chromium-vanadium steels such as those of the 4100 and 6100 series, a grain size of 5–7 and forging temperature of 2250–2350° F. for the 6100 series; and for nickel-chromium-vanadium steels such as those of the 4600 and 4800 series, a grain size of 6–8 and a forging temperature of 2200–2300° F. After the upsetting and forging have been completed the blank is subjected to the annealing treatment, depending on the specification of the steel. On all oil hardened steels the treatment comprises heating to 150° F. above the $Ac_3$ point, holding at this temperature for approximately 40 minutes, cooling to 10° above the $Ar_1$, holding on that temperature for an hour, then cooling slowly down through the $Ar_3$ point (50° per hour) to 100–150° F. below the $Ar_3$. The carburizing steels are similarly treated except that the high temperature in the annealing cycle should be 50° F. above the temperature used when carburizing or hardening.

Forgings made as above described, since they possess a very high and uniform degree of machineability, may be machined at much lower cost than forgings of conventional character. This is due not only to reduced cost of maintaining tools but also to the possibility of establishing a much higher rate of production by reason of increased cutting speeds, rate of feed, etc., it being no longer necessary to adjust the machining schedule to the machineability of the less readily machined forgings of a widely varying lot.

The finished articles are also much more accurate for several reasons. In the first place, the ease of machining and uniformity of machining characteristics enables the articles coming from the machines to be maintained within very low tolerances as to size. Furthermore, the homogeneity of physical properties in the machined articles as well as the accuracy of machining result in extremely uniform changes in size and minimum distortion or "warpage" during the subsequent heat treatment or "firing." The changes due to heat treatment can therefore be correctly estimated and proper allowance made in the machining operation. As a result I am able to produce finished articles requiring a high degree of accuracy of size, shape and alignment, such as gears, with a uniformity of excellence which has hitherto been impossible, so far as I am aware, except by much more costly processes.

Not only is the process of importance in reducing the cost of production and in the very material reduction in defective "rejects" but it is of even greater importance in improvement of operation and increase in useful life of the product. This may be readily understood from the fact that actual dynamometer tests have shown an increase of life in a gear of 400 times by an increase in accuracy of contour of no more than .002 inch. Added to this, of course, is the very great improvement in silence of operation in the case of intermeshing parts such as automobile gear sets.

I claim:

1. The process of making steel articles comprising producing stock from steel of relatively coarse grain, heating said stock to forging temperature, forging the stock between dies formed to confine and densify the forged article, and machining the article, the grain of the stock before forging corresponding approximately to numbers on the McQuaid-Ehn scale as follows: for steels of the 1300, 3100, 3200, 5100 series, numbers 3–5; for steels of the 2000, 2300, 2500 series, numbers 4–6; for steels of the 4100, 6100 series, numbers 5–7 and for steels of the 4600, 4800 series, numbers 6–8.

2. The process of making steel articles comprising producing stock from steel of relatively coarse grain, heating said stock to forging temperature, forging the stock between dies formed to confine and densify the forged article, and machining the article, the stock being heated for forging approximately as follows: for steels of the 1300, 3100, 3200, 5100 series, a temperature of 2300–2400° F.; for steels of the 2000, 2300, 2500 series, a temperature of 2150–2250° F.; for steels of the 4100 series, a temperature of 2250–2350° F.; for steels of the 6100 series, a temperature of 2150–2250° F.; and for steels of the 4600, 4800 series, a temperature of 2200–2300° F.

3. The process of making steel articles comprising producing stock from steel of relatively coarse grain, heating said stock to forging temperature, forging the stock between dies formed to confine and densify the forged article, and machining the article, the stock being cylindrical bar stock of 1–4 inches in diameter rolled from ingots of the Gathmann type varying approximately as follows:—stock of 1 to 1⅝" from ingots of 12–14 inches in diameter weighing 4000 lbs., stock of 1¾ to 2½ in. from ingots of 19–20 in. weighing 6000 lbs., and stock of 2¾ to 4 in. from ingots of 26–28 in. weighing 8000 lbs.

4. The process of forming gear blanks comprising heating a piece of cylindrical steel bar stock to temperatures set forth in claim 2 and forming the blank by endwise pressure while confined in dies, the stock being selected of such size as to completely fill the die while under pressure without material formation of flash.

WILBUR E. SANDERS.